No. 777,938. PATENTED DEC. 20, 1904.
J. B. CARTER.
CHECK ROW CORN PLANTER.
APPLICATION FILED NOV. 11, 1903.
NO MODEL. 2 SHEETS—SHEET 1.

No. 777,938. PATENTED DEC. 20, 1904.
J. B. CARTER.
CHECK ROW CORN PLANTER.
APPLICATION FILED NOV. 11, 1903.
NO MODEL. 2 SHEETS—SHEET 2.

Witnesses
C. B. Bull
C. M. Cooke

Inventor
Jesse B. Carter,
by G. W. T. Howard
Attorneys

No. 777,938. Patented December 20, 1904.

UNITED STATES PATENT OFFICE.

JESSE B. CARTER, OF BLUFFS, ILLINOIS, ASSIGNOR OF ONE-HALF TO WILLIAM McCALEB, OF BLUFFS, ILLINOIS.

CHECK-ROW CORN-PLANTER.

SPECIFICATION forming part of Letters Patent No. 777,938, dated December 20, 1904.

Application filed November 11, 1903. Serial No. 180,701.

*To all whom it may concern:*

Be it known that I, JESSE B. CARTER, a citizen of the United States, residing at Bluffs, in the county of Scott and State of Illinois, have invented certain new and useful Improvements in Check-Row Corn-Planters; and I do hereby declare the following to be a full, clear, and exact description of the invention, such as will enable others skilled in the art to which it appertains to make and use the same.

This invention relates to improvements in check-row corn-planters in which is employed wire-carrying buttons, which are caused to engage with a fork to operate devices carried upon the planter for dropping the corn at regular intervals and is an improvement upon the invention set forth in Letters Patent No. 674,233, granted to me May 14, 1901.

The invention relates, first, to means whereby in a convenient and simple manner the machine may be converted into a drill, and, secondly, to means whereby the pocketed wheels which close the bottom of the hoppers may be adjusted so as to vary or regulate the amount of corn dropped without stopping the machine.

Other features of improvement will appear in the description which follows and in the claims.

Figure 1:
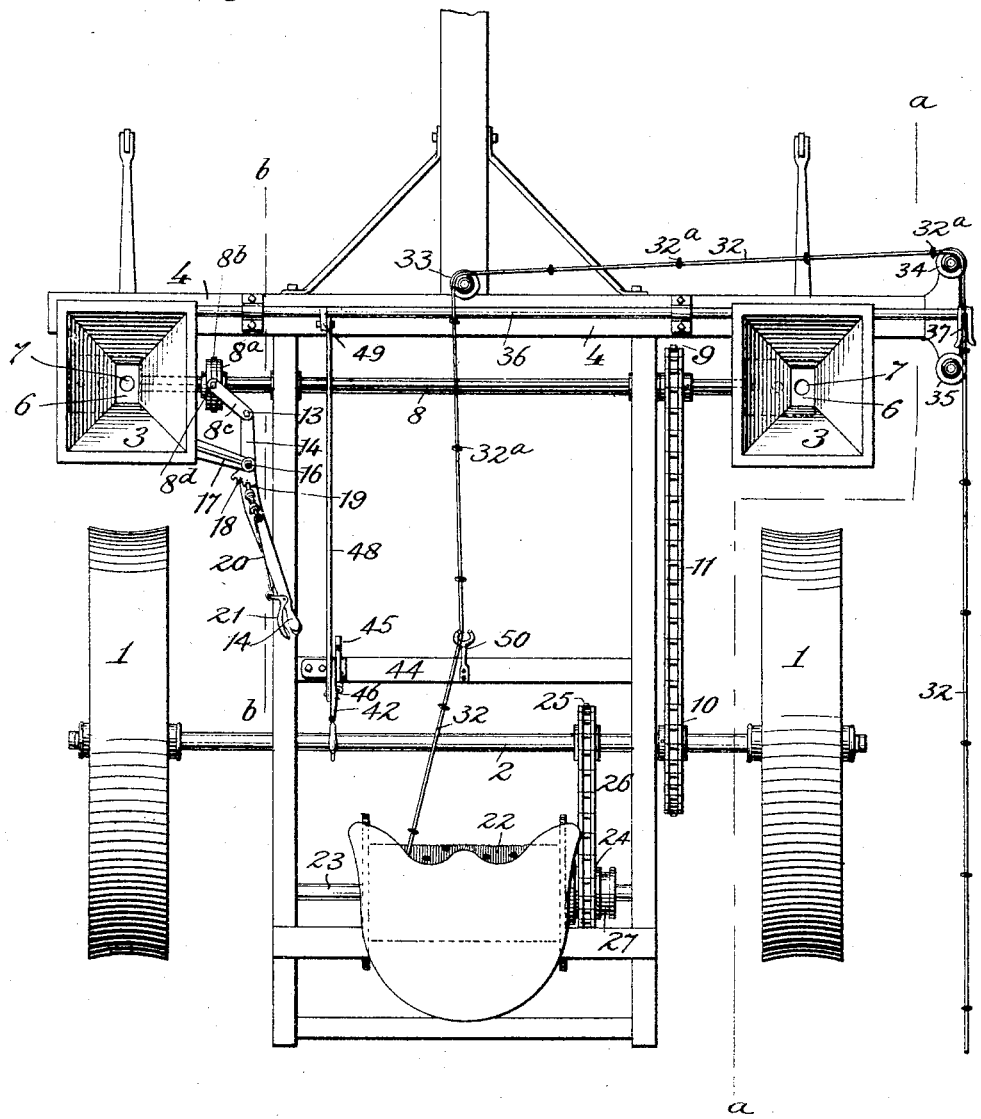
Figure 2:
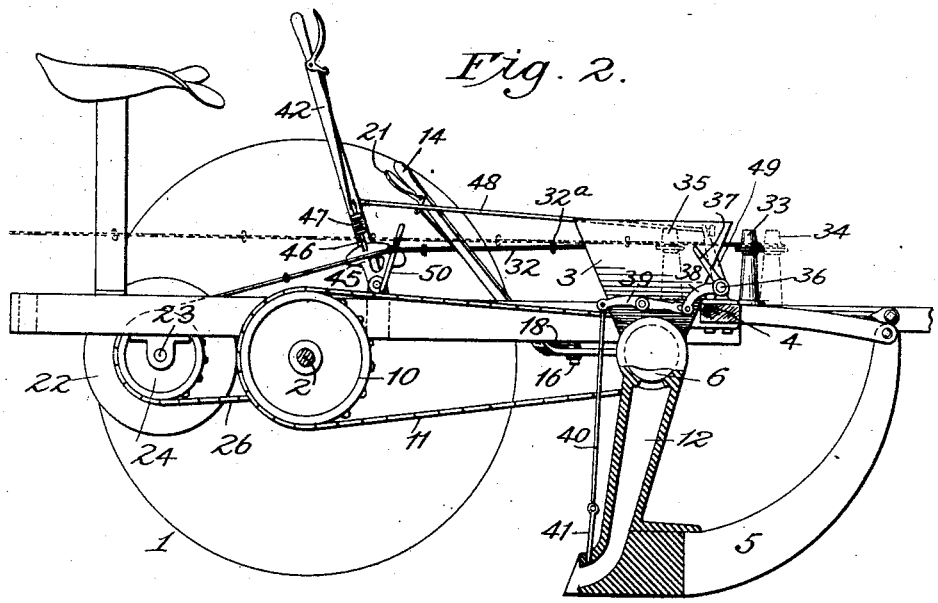
Figure 3:
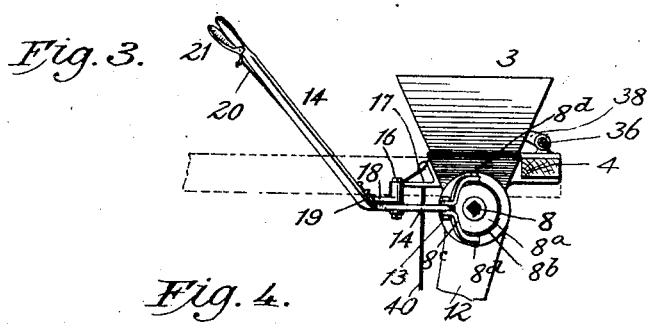
Figure 4:
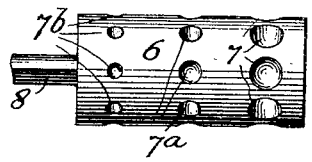

In the accompanying drawings, Figure 1 is a top view of my improved planter. Fig. 2 is a side elevation thereof, partly in section, on the line $a\ a$, Fig. 1. Fig. 3 is a section on the line $b\ b$, Fig. 1. Fig. 4 is a detail of the feed-wheel.

Similar numerals indicate similar parts in the respective figures.

The frame, which is of the usual form, is supported upon wheels 1 1, one of which is keyed to and rotates the axle 2. If desired, both wheels may be connected to the axle by ratchet-clutches or otherwise. The corn-hoppers 3 3 are supported upon the cross-beam 4 and placed immediately over the runners or furrow-openers 5. At the bottom of each hopper 4 is a flat-ended wheel 6, (see particularly Fig. 4,) completely closing the hopper. Each wheel is provided with a series of pockets 7 $7^a$ $7^b$, those 7 being of greater capacity than those $7^a$, which in turn are of greater capacity than the pockets $7^b$. The wheels 6 are adapted to be steadily rotated and feed the corn regularly into the legs 12 of the runners 5, as in my former patent. For rotating the wheels 6 their supporting-shaft 8, which is preferably square in cross-section, is connected to and revolved by a sprocket-wheel 9, in turn rotated by a sprocket-wheel 10 on the axle 2, the said wheels being united by a chain 11. The sprocket-wheel 9 is adapted to loosely fit the squared shaft 8, so that the shaft may be slid within said wheel, although the latter, as will be understood, is so fixed to the shaft as to partake of its rotary movement. The shaft 8, as seen at the left of Fig. 1, is provided with a grooved collar $8^a$, keyed or secured permanently to the shaft, so as to rotate therewith. A strap $8^b$ rests in the groove of the collar $8^a$ and is connected with a two-part forked link $8^c$, connected to the strap by means of bolts $8^d$. This link has a loose connection by means of the bolt 13 with a lever 14, having its fulcrum 16 in a bracket 17, secured to one hopper 3. The bracket 17 is furnished with a toothed segment 18, into which a pawl 19, attached to a rod 20, is adapted to enter, said rod being secured to the handle 21, pivoted to the outer end of the lever 14, all as clearly indicated in Figs. 1 and 3. As shown in Fig. 1, the pockets 7 of the flat-faced wheels 6 are in the center line of the hoppers, and upon the rotation of said wheels the greatest quantity of corn intended to be distributed will be dropped; but if it is desired to drop a smaller quantity of corn by moving the lever 14 to the left, Fig. 1, and allowing its pawl 19 to engage the central notch of the segment 18 the pockets $7^a$ will be brought centrally of the hopper and a diminished quantity of corn will be dropped. Should it be desired to drop a still lesser quantity, the pockets $7^b$ are brought centrally of the hopper by moving the lever 14 so that its pawl 19 will engage the outer notch of the segment 18. It will be understood that the sprocket-wheel 9 while turning with the shaft 8 will allow the latter to slide within it, the position of the sprocket-wheel remaining unchanged.

As in my Patent No. 674,233, the check-row mechanism includes a reel 22, mounted behind the supporting-axle 2 on a shaft 23, the reel being rotated by means of a sprocket 24, axle-sprocket 25, and chain 26. The sprocket 24 is connected to rotate the reel by means of a clutch 27, which features, however, forming no part of my present invention, are not particularly illustrated and described. The wire 32 passes from the reel to the anchor, being led around the central guide-pulley 33 in the front part of the frame to either of the side pulleys 34 35, as may depend upon the direction of travel of the machine. The second drop or valve mechanism is also substantially as in my said patent, consisting of the transverse shaft 36, supported upon the cross-beam 4 and carrying the fork 37. The fork is connected by suitable levers 38 39 and rod 40 with the sliding gate 41. In the operation of the device for intermittently distributing the corn the buttons $32^a$ on the wire 32 engage at the proper intervals with the fork 37, the result being the elevation and depression of the gate 41, as will be readily understood.

In Fig. 2 the gate is shown elevated, the machine being adapted as a drill. This position of the gate is effected by the following devices: A lever 42 is pivoted to the cross-beam 44, there being provided a notched quadrant 45. The lever is furnished with a sliding pawl 46, normally impelled by a spring 47 to enter one of the notches of the quadrant. When it is desired to lift the gate 41, the lever 42 is drawn back from the forward notch and through the medium of the rod 48, which connects with an arm 49, mounted upon the shaft 36, said arm 37 is drawn back, the action being such through the intervening levers and rod 40 that the gate 41 is lifted, the pawl 46 being caused to rest in the rear notch of the quadrant 45. By this action the fork 37 is depressed out of the line of the wire 32. In Fig. 2 the central pulley 33 is shown in full lines, the pulleys 34 35 being represented in dotted lines. The general operation of the machine, apart from the devices for regulating the distribution of corn and for converting the machine into a drill, is substantially the same as in my said Patent No. 674,233.

Mounted upon the cross-beam 44 is a guide 50, the function of which will be clearly understood by reference to Fig. 1. It will be seen that the wire 32, leaving the reel 22, passes through the guide 50 and is led by it in a line approximating that of the longitudinal center of the machine to and over a central pulley 33. The result is that the wire is more readily guided and paid out with greater ease than would be the case were the guide omitted.

I do not restrict myself to the exact details of construction, combination, and arrangement herein set forth, it being obvious that minor variations thereof not involving the exercise of invention may be made by the skilled mechanic, and such departures from what is herein described and claimed not involving invention I consider as within the scope and terms of my claims.

Having thus described my invention, I claim—

1. In a check-row corn-planter, the combination with the seed-tubes, of a vertically-slidable valve movable across the end of the seed-tube, a rock-shaft actuated by the check-row wire, connections between said rock-shaft and the valve whereby the valve may be raised and lowered to open and close the end of the tube, and means for holding the shaft disconnected from the check-row wire whereby the valve may be maintained in its raised position, substantially as set forth.

2. The combination with the frame, and the seed-tubes, of a vertically-slidable valve mounted in the rear wall of said tube and adapted to move across the end of the same, a rock-shaft mounted on the frame, means for actuating said shaft, connections between said shaft and the valve whereby the valve may be raised and lowered to open and close the end of the tube, a crank-arm on said shaft, a lever mounted on the frame, and a link connecting the crank-arm with said lever, substantially as set forth.

In testimony whereof I hereunto set my hand.

JESSE B. CARTER.

Witnesses:
 AUGUST FROHWITTER,
 I. M. TAYLOR.